US011739695B2

(12) United States Patent
Dede et al.

(10) Patent No.: US 11,739,695 B2
(45) Date of Patent: Aug. 29, 2023

(54) GAS TURBINE ENGINE MAINTENANCE TOOL

(71) Applicant: General Electric Company, Schenectady, NY (US)

(72) Inventors: Mehmet M. Dede, Liberty Township, OH (US); Byron Andrew Pritchard, Jr., Loveland, OH (US); David Scott Diwinsky, West Chester, OH (US); Wayne Ray Grady, Hamilton, OH (US); Marc Metz, Enon, OH (US); Gary Lee Ward, Pleasant Hill, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/351,813

(22) Filed: Jun. 18, 2021

(65) Prior Publication Data

US 2021/0310415 A1 Oct. 7, 2021

Related U.S. Application Data

(63) Continuation of application No. 15/370,398, filed on Dec. 6, 2016, now Pat. No. 11,067,002.

(51) Int. Cl.
*F02C 7/32* (2006.01)
*F02C 3/04* (2006.01)
(Continued)

(52) U.S. Cl.
CPC ............. *F02C 7/32* (2013.01); *F01D 25/285* (2013.01); *F02C 3/04* (2013.01); *H04N 7/181* (2013.01);
(Continued)

(58) Field of Classification Search
CPC .. F02C 3/04; F02C 7/32; F01D 25/285; F01D 21/003; F01D 21/20; F05D 220/32;
(Continued)

(56) References Cited

U.S. PATENT DOCUMENTS 1,513,624 A 10/1924 Parker
2,564,677 A 8/1951 Davis
(Continued)

FOREIGN PATENT DOCUMENTS

CN 2597669 Y 1/2004
DE 19924607 A1 11/2000
(Continued)

OTHER PUBLICATIONS

European Search Report Corresponding to EP17879045 dated Jul. 27, 2020.
(Continued)

*Primary Examiner* — Jason H Duger
(74) *Attorney, Agent, or Firm* — Fitch, Even, Tabin & Flannery LLP

(57) ABSTRACT

A maintenance tool for gas turbine engine includes a rail system having a plurality of rail segments insertable through one or more inspection holes of the gas turbine engine for assembly within a core air flowpath of the gas turbine engine. The maintenance tool additionally includes a maintenance head movable along the plurality of rail segments of the rail system for performing maintenance operations within the core air flowpath.

19 Claims, 11 Drawing Sheets

(51) Int. Cl.
  *H04N 7/18* (2006.01)
  *F01D 25/28* (2006.01)
  *B05B 13/06* (2006.01)
(52) U.S. Cl.
  CPC ...... *B05B 13/0627* (2013.01); *F05D 2220/32* (2013.01); *F05D 2230/72* (2013.01); *F05D 2230/90* (2013.01); *F05D 2240/35* (2013.01); *Y02T 50/60* (2013.01)
(58) Field of Classification Search
  CPC ............. F05D 2230/72; F05D 2230/90; F05D 2240/35; F05D 2270/804; F05D 2270/8041; G02B 23/2476; G02B 23/2484; G02B 23/2492; G01N 21/954; G01N 2021/9542; G01N 2021/9544; G01M 15/14; H04N 7/181; F23R 2900/00019; B05B 13/0627
  See application file for complete search history.

(56) References Cited

U.S. PATENT DOCUMENTS

| | | | |
|---|---|---|---|
| 3,131,091 | A | 4/1964 | Jones |
| 3,635,401 | A | 1/1972 | Bromley |
| 3,917,432 | A | 11/1975 | Feuerstein et al. |
| 3,925,580 | A | 12/1975 | Brewer |
| 4,659,195 | A * | 4/1987 | D'Amelio ............ G01N 21/954 359/503 |
| 4,688,555 | A | 8/1987 | Wardle |
| 5,028,117 | A | 7/1991 | Muhlenkamp-Becker |
| 5,262,206 | A | 11/1993 | Rangaswamy |
| 5,372,312 | A | 12/1994 | Vidusek |
| 5,453,383 | A | 9/1995 | Roufs |
| 5,474,235 | A | 12/1995 | Cole |
| 5,644,394 | A | 7/1997 | Owens |
| 5,867,885 | A | 2/1999 | Bales et al. |
| 6,010,746 | A | 1/2000 | Descoteaux |
| 6,414,458 | B1 | 7/2002 | Hatley et al. |
| 6,459,481 | B1 | 10/2002 | Schaack |
| 6,465,090 | B1 | 10/2002 | Stowell |
| 6,532,840 | B2 | 3/2003 | Hatley et al. |
| 6,619,109 | B1 | 9/2003 | Dailey et al. |
| 7,090,637 | B2 | 8/2006 | Danitz et al. |
| 7,506,822 | B2 | 3/2009 | Cairo |
| 7,509,735 | B2 | 3/2009 | Philip et al. |
| 7,531,048 | B2 | 5/2009 | Woodcock et al. |
| 7,582,359 | B2 | 9/2009 | Sabol |
| 7,617,603 | B2 | 11/2009 | Coleman et al. |
| 7,690,840 | B2 | 4/2010 | Zombo |
| 8,221,825 | B2 | 7/2012 | Reitz |
| 8,356,482 | B2 | 1/2013 | Duval |
| 8,470,460 | B2 | 6/2013 | Lee |
| 8,742,944 | B2 | 6/2014 | Mitchell |
| 8,758,502 | B2 | 6/2014 | Nienburg |
| 8,986,778 | B2 | 3/2015 | Zombo |
| 9,073,077 | B2 | 7/2015 | Unosawa |
| 9,096,736 | B2 | 8/2015 | Tanaka |
| 9,096,763 | B2 | 8/2015 | Belov |
| 9,102,015 | B2 | 8/2015 | Kulkarni |
| 9,212,947 | B2 | 12/2015 | Feist |
| 9,254,077 | B2 | 2/2016 | Soetermans |
| 9,341,586 | B2 | 5/2016 | Henderkott |
| 9,395,301 | B2 | 7/2016 | Cheverton |
| 9,983,147 | B2 | 5/2018 | Shayan |
| 10,265,725 | B2 | 4/2019 | Kulkarni |
| 10,364,701 | B2 | 7/2019 | Keshavan |
| 10,384,808 | B2 | 8/2019 | Bewlay |
| 10,589,300 | B2 | 3/2020 | Bewlay |
| 10,875,054 | B2 | 12/2020 | Kulkarni |
| 10,994,287 | B2 | 5/2021 | Kulkarni |
| 11,067,002 | B2 | 7/2021 | Dede |
| 11,358,171 | B2 | 6/2022 | Bewlay |
| 2003/0221315 | A1 | 12/2003 | Baumann |
| 2003/0229420 | A1 * | 12/2003 | Buckingham ......... A61B 34/30 700/245 |
| 2004/0124268 | A1 | 7/2004 | Frazier |
| 2004/0228976 | A1 | 11/2004 | Skoog |
| 2005/0235493 | A1 | 10/2005 | Philip et al. |
| 2006/0006589 | A1 | 1/2006 | Canova |
| 2006/0042083 | A1 | 3/2006 | Baker et al. |
| 2006/0045985 | A1 | 3/2006 | Kozak |
| 2007/0063351 | A1 | 3/2007 | Duda |
| 2008/0287741 | A1 | 11/2008 | Ostrovsky et al. |
| 2009/0169752 | A1 | 7/2009 | Fu |
| 2009/0252985 | A1 | 10/2009 | Nagaraj |
| 2010/0136349 | A1 | 6/2010 | Lee |
| 2012/0009080 | A1 | 1/2012 | Shaw |
| 2012/0037074 | A1 | 2/2012 | Outland |
| 2012/0279323 | A1 * | 11/2012 | Broda ................ G02B 23/2492 73/865.8 |
| 2012/0283963 | A1 | 11/2012 | Mitchell |
| 2012/0312103 | A1 * | 12/2012 | Hannott ................ A61B 1/008 73/865.8 |
| 2013/0074334 | A1 | 3/2013 | Swiderski et al. |
| 2013/0232792 | A1 | 9/2013 | Quinones et al. |
| 2014/0055596 | A1 | 2/2014 | Hatcher, Jr. et al. |
| 2014/0248425 | A1 | 9/2014 | Patterson et al. |
| 2014/0261824 | A1 | 9/2014 | Byers |
| 2015/0028132 | A1 | 1/2015 | Vidusek |
| 2015/0125286 | A1 | 5/2015 | Suciu et al. |
| 2015/0160097 | A1 | 6/2015 | Haldeman |
| 2015/0209915 | A1 * | 7/2015 | Rautenberg ........... F01D 21/003 29/888.021 |
| 2015/0321964 | A1 | 11/2015 | Sun |
| 2015/0355055 | A1 | 12/2015 | Utay |
| 2016/0018292 | A1 | 1/2016 | DeAscanis et al. |
| 2016/0069743 | A1 | 3/2016 | McQuilkin |
| 2016/0069829 | A1 | 3/2016 | Ruhge et al. |
| 2016/0160679 | A1 | 6/2016 | Griffiths |
| 2016/0207639 | A1 | 7/2016 | Ellis |
| 2016/0273114 | A1 | 9/2016 | Hongoh |
| 2017/0157719 | A1 | 6/2017 | Diwinsky |
| 2017/0173611 | A1 | 6/2017 | Tan |
| 2017/0361919 | A1 | 12/2017 | Waddleton |
| 2018/0002816 | A1 | 1/2018 | Kennedy |
| 2018/0154381 | A1 | 6/2018 | Bewlay |
| 2018/0250688 | A1 | 9/2018 | Kulkarni |
| 2019/0003954 | A1 | 1/2019 | Detor |
| 2020/0164392 | A1 | 5/2020 | Bewlay |

FOREIGN PATENT DOCUMENTS

| | | |
|---|---|---|
| EP | 1494020 A1 | 1/2005 |
| EP | 2889711 | 7/2015 |
| EP | 3043299 | 7/2016 |
| EP | 3214519 A1 | 9/2017 |
| JP | 2000162350 A | 6/2000 |
| JP | 2001/162350 A | 6/2001 |
| JP | 2015/059556 A | 3/2015 |
| KR | 101004292 B1 | 1/2011 |
| WO | 2007023292 A2 | 3/2007 |
| WO | 2012151150 | 11/2012 |
| WO | 2015086957 A2 | 6/2015 |
| WO | 2015116300 | 8/2015 |

OTHER PUBLICATIONS

PCT International Search Report & Opinion Corresponding to PCT/US2017/062618 dated Feb. 22, 2018.
Bilge Senturk, et al.; CMAS-Resistant Plasma Sprayed Thermal Barrier Coatings Based on Y2O3-Stablized Zro2 with Al3+ and Ti4+ Solute Additions; Journal of Thermal Spray Technology, Apr. 2014; vol. 23, Issue 4; pp. 708-715.
Rai, et al.; CMAS-Resistant Thermal Barrier Coatings (TBC); International Journal of Applied Ceramic Technology; May 2009; vol. 7, Issue 5; pp. 662-674.
Steinke et al., A Novel Test Approach for Plasma-Sprayed Coatings Tested Simultaneously Under CMAS and Thermal Gradient Cycling Conditions, Surface and Coatings Technology 205.7, 2010, pp. 2287-2295.

(56) References Cited

OTHER PUBLICATIONS

Wu, et al.; Evaluation of Plasma Sprayed YSZ Thermal Barrier Coatings with the CMAS Deposits Infiltration using Impedance Spectroscopy; Progress in Natural Science: Material International; Feb. 2012; vol. 22, Issue 1; pp. 40-47.

* cited by examiner

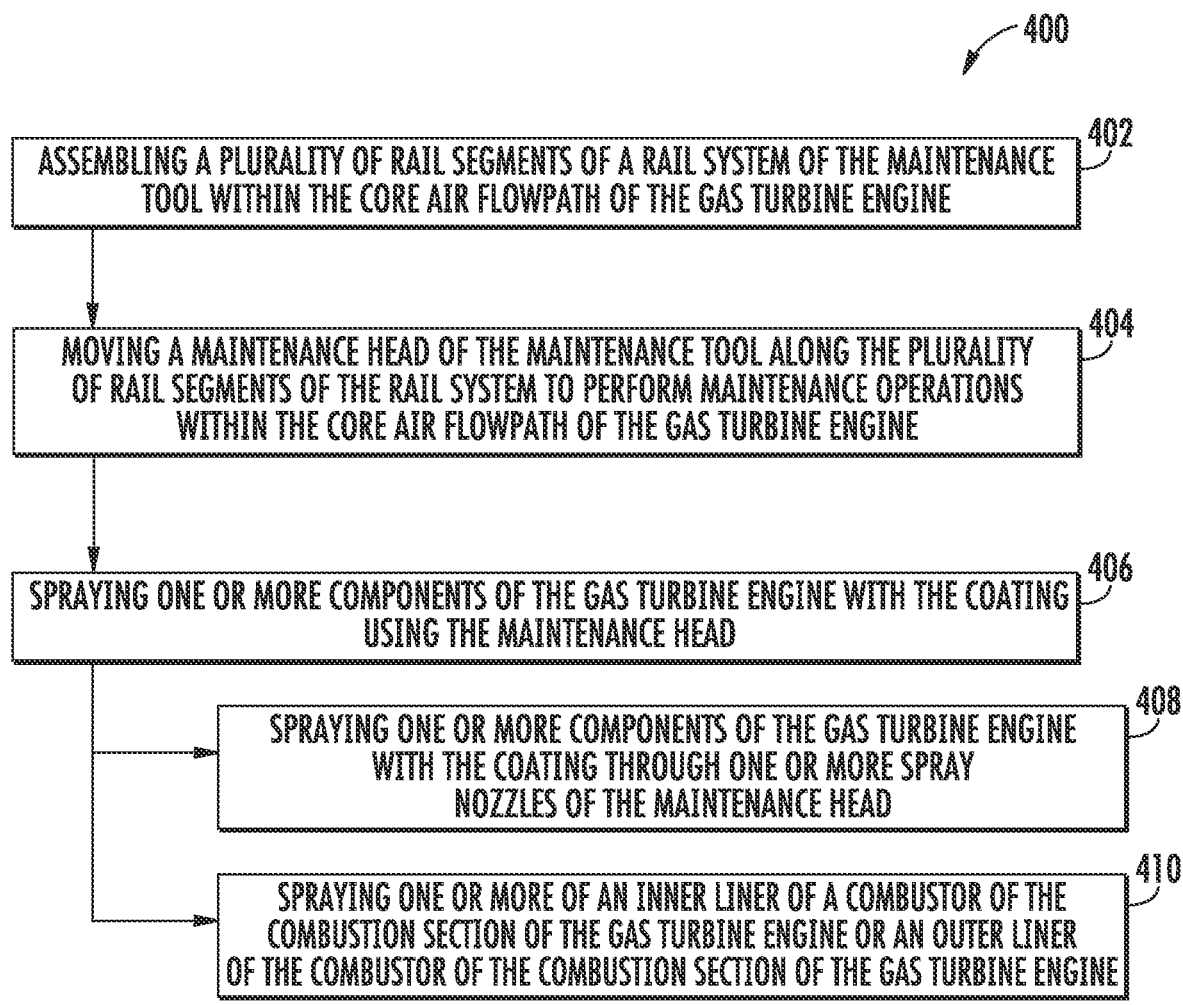

GAS TURBINE ENGINE MAINTENANCE TOOL

CROSS-REFERENCE TO RELATED APPLICATION

This application is a continuation of U.S. patent application Ser. No. 15/370,398, entitled "GAS TURBINE ENGINE MAINTENANCE TOOL," filed Dec. 6, 2016, which is herein incorporated by reference in its entirety.

FIELD OF THE INVENTION

The present subject matter relates generally to an inspection tool for gas turbine engine.

BACKGROUND OF THE INVENTION

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Periodically, the gas turbine engine is inspected during maintenance intervals to determine an amount of wear on, e.g., the internal components of the gas turbine engine. For example, gas turbine engines typically include one or more inspection holes allowing a technician to view into a core air flowpath of the gas turbine engine. A flexible borescope may be inserted through these inspection holes facilitating such inspection and allowing the technician to take images of the one or more components. However, depending on the technician performing the inspection, the images taken of the components may not be properly documented or cataloged, and further will likely show a skewed angle of the components. Such may make it difficult to keep an eye on any potentially problematic areas of the gas turbine engine across a gas turbine engine's periodic maintenance intervals, especially if different technicians are used for the inspections. Additionally, skewed angle views of the components may make it difficult to identify the component and/or a location on the components being captured in the image.

Accordingly, a tool for performing certain maintenance operations of the gas turbine engine providing benefits despite inexperienced technicians or different technicians during different maintenance intervals would be useful. More specifically, a tool for taking images of the internal components of the gas turbine engine capable of more accurately cataloguing these images would be especially useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a maintenance tool for a gas turbine engine is provided. The gas turbine engine defines a core air flowpath and a plurality of inspection holes. The maintenance tool includes a rail system having a plurality of rail segments insertable through one or more of the inspection holes of the gas turbine engine for assembly within the core air flowpath. The maintenance tool additionally includes a maintenance head moveable along the plurality of rail segments of the rail system for performing maintenance operations within the core air flowpath.

In another exemplary embodiment of the present disclosure, a gas turbine engine system is provided. The gas turbine engine system includes a gas turbine engine having a compressor section, a combustion section, and a turbine section in serial flow order and together defining at least in part a core air flowpath. The gas turbine engine defines one or more inspection holes. The gas turbine engine system also includes a maintenance tool. The maintenance tool includes a rail system having a plurality of rail segments assembled within the core air flowpath. The maintenance tool also includes a maintenance head positioned within the core air flowpath and moveable along the plurality of rail segments of the rail system for performing maintenance operations within the core air flowpath.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 14 is a flow diagram of a method for performing maintenance operations in accordance with another exemplary aspect of the present disclosure.

DETAILED DESCRIPTION OF THE INVENTION

Figure 1:
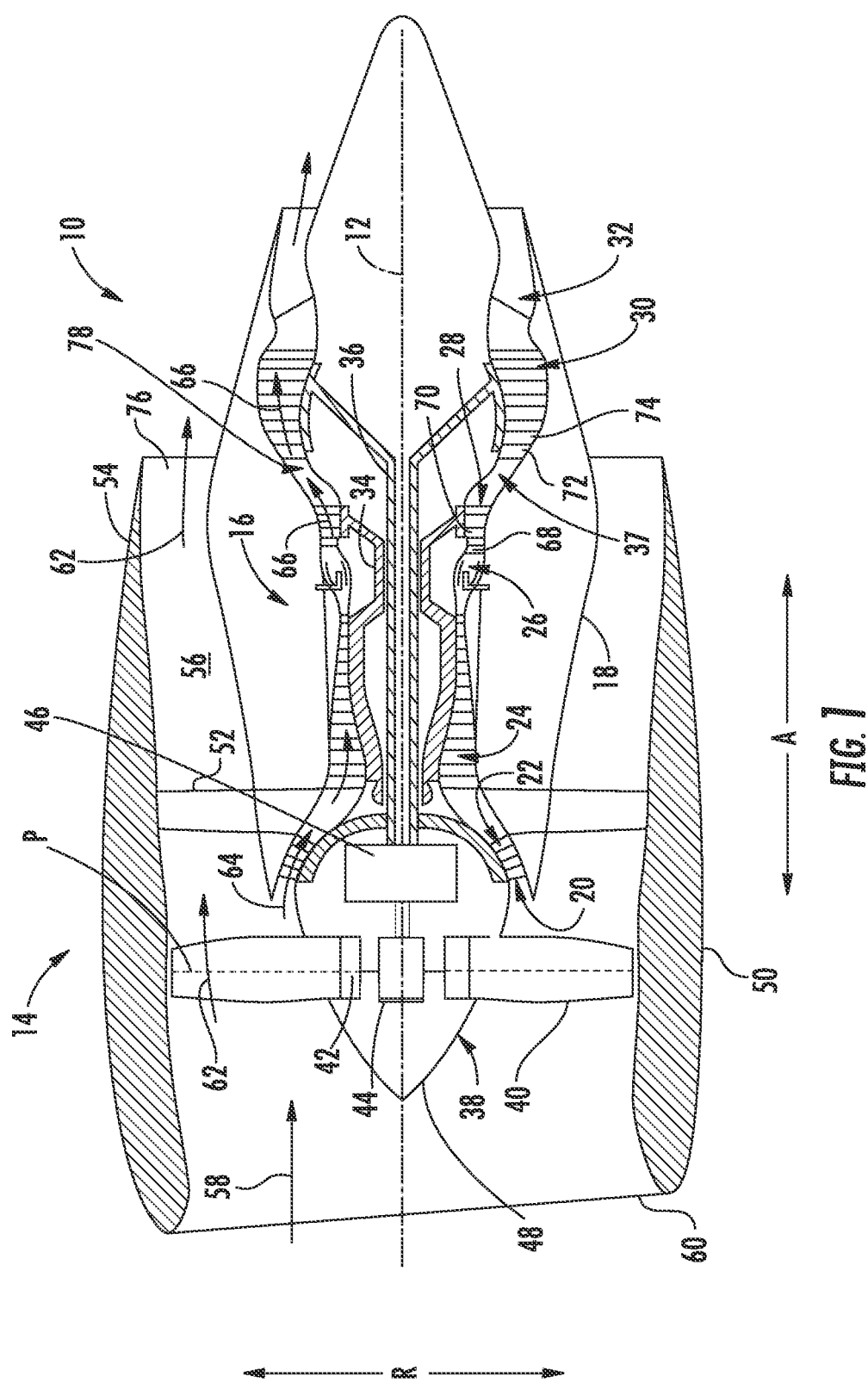
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is an aeronautical, high-bypass turbofan jet engine 10, referred to herein as "turbofan engine 10", configured to be mounted to an aircraft, such as in an under-wing configuration or tail-mounted configuration. As shown in FIG. 1, the turbofan engine 10 defines an axial direction A (extending parallel to a longitudinal centerline 12 provided for reference), a radial direction R, and a circumferential direction (i.e., a direction extending about the axial direction A; see FIG. 3). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a first, booster or low pressure (LP) compressor 22 and a second, high pressure (HP) compressor 24; a combustion section 26; a turbine section including a first, high pressure (HP) turbine 28 and a second, low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and jet exhaust nozzle section 32 together define a core air flowpath 37 through the core turbine engine 16.

Referring still the embodiment of FIG. 1, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40, e.g., in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. Moreover, for the embodiment depicted, the nacelle 50 is supported relative to the core turbine engine 16 by a plurality of circumferentially-spaced outlet guide vanes 52. Further, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26.

Referring still to FIG. 1, the compressed second portion of air 64 from the compressor section mixes with fuel and is burned within the combustion section to provide combustion gases 66. The combustion gases 66 are routed from the combustion section 26, through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34 (depicted in greater detail in FIG. 2), thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated that the exemplary turbofan engine 10 depicted in FIG. 1 is provided by way of example only, and that in other exemplary embodiments, the turbofan engine 10 may have any other suitable configuration. Additionally, or alternatively, aspects of the present disclosure may be utilized with any other suitable aeronautical gas turbine engine, such as a turboshaft engine, turboprop engine, turbojet engine, etc. Further, aspects of the present disclosure may further be utilized with any other land-based gas turbine engine, such as a power generation gas turbine engine, or any aero derivative gas turbine engine, such as a nautical gas turbine engine.

Figure 2:
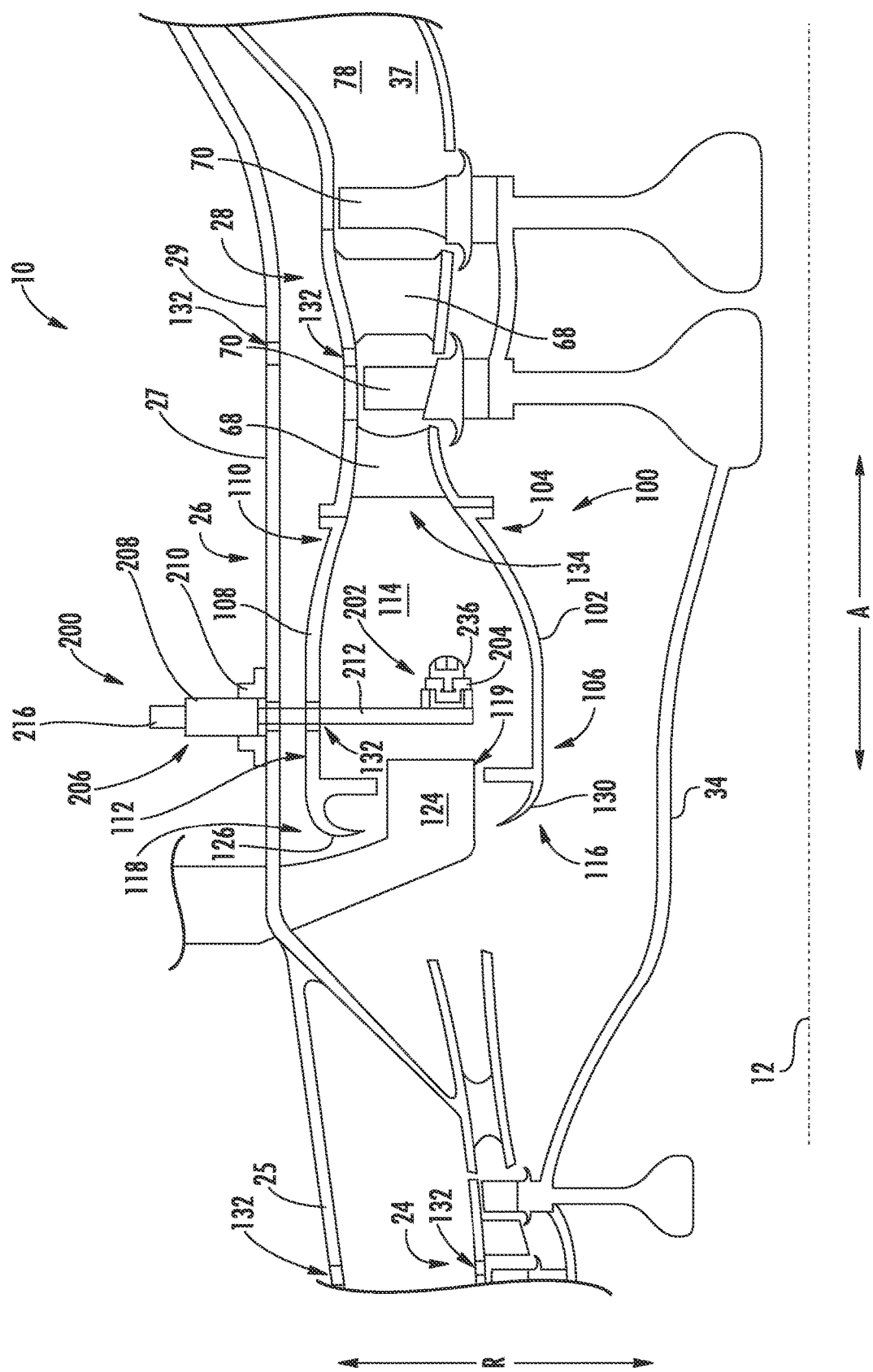
FIG. 2 is a schematic, cross-sectional view of a combustion section of the exemplary gas turbine engine of FIG. 1.

Referring now to FIG. 2, a close-up view of a portion of the exemplary turbofan engine 10 of FIG. 1 is provided. More specifically, FIG. 2 provides a close-up view of an aft end of the HP compressor 24 of the compressor section, the combustion section 26, and the HP turbine 28 of the turbine section.

As shown, combustion section 26 includes a combustor assembly 100. The combustor assembly 100 generally includes an inner liner 102 extending between an aft end 104 and a forward end 106 generally along the axial direction A, as well as an outer liner 108 also extending between an aft end 110 and a forward end 112 generally along the axial direction A. The inner and outer liners 102, 108 together at least partially define a combustion chamber 114 therebetween. The inner and outer liners 102, 108 are each attached to or formed integrally with an annular dome. More particularly, the annular dome includes an inner dome section 116 attached to, or formed integrally with, the forward end 106 of the inner liner 102 and an outer dome section 118 attached to, or formed integrally with, the forward end 112 of the outer liner 108. Further, the inner and outer dome section 116, 118 may each be formed integrally (or alternatively may be formed of a plurality of components attached in any suitable manner) and may each extend along the circumferential direction C to define an annular shape. It should be appreciated, however, that in other embodiments, the combustor assembly 100 may not include the inner and/or outer dome sections 116, 118; may include separately formed inner and/or outer dome sections 116, 118 attached to the respective inner liner 102 and outer liner 108; or may have any other suitable configuration.

For the embodiment depicted, the inner liner 102 and the outer liner 108 may each formed of a refractory material, such as a ceramic matrix composite (CMC) material, which is a non-metallic material having high temperature capability. However, in other embodiments, one or both of the inner liner 102 and the outer liner 108 may alternatively be formed of any other suitable material, such as a suitable metal material.

Additionally, for the embodiment depicted, the turbofan engine 10 includes an outer casing. More specifically, the turbofan engine 10 includes an outer compressor casing 25, an outer combustor casing 27, and an outer turbine casing 29. The combustor assembly 100 is generally positioned within, and surrounded by, the outer combustor casing 27. Additionally, although not depicted the combustor assembly may be attached to the outer combustor casing, for example, the outer liner 108 of the combustor assembly 100 may be attached to the outer combustor casing 27.

Referring still to FIG. 2, the combustor assembly 100 further includes a plurality of fuel air mixers 124 spaced along the circumferential direction C (see FIG. 3) and positioned at least partially within the annular dome. More particularly, each of the plurality of fuel air mixers 124 is disposed at least partially between the outer dome section 118 and the inner dome section 116 along the radial direction R, through an opening 119 defined by the annular dome. During operation, compressed air from the compressor section of the turbofan engine 10 flows into or through the fuel air mixers 124, where the compressed air is mixed with fuel and ignited to create the combustion gases 66 within the combustion chamber 114. The inner and outer dome sections 116, 118 are configured to assist in providing such a flow of compressed air from the compressor section into or through the fuel air mixers 124. For example, the outer dome section 118 includes an outer cowl 126 at a forward end and the inner dome section 116 similarly includes an inner cowl 130 at a forward end. The outer cowl 126 and inner cowl 130 may assist in directing the flow of compressed air from the compressor section 26 into or through one or more of the fuel air mixers 124. Again, however, in other embodiments, the annular dome may be configured in any other suitable manner.

Moreover, it will be appreciated, that the exemplary turbofan engine depicted in FIG. 2 includes a plurality of inspection holes 132. For example, the compressor section includes one or more inspection holes 132, the combustion section includes one or more inspection holes 132, and the turbine section includes one or more inspection holes 132. During operation of the turbofan engine, these inspection holes 132 are covered with a cap or plug to maintain the integrity of the component through which the inspection hole 132 is defined. As is described in greater detail below, inspection holes 132 are, in certain embodiments, spaced along the circumferential direction C of the turbofan engine 10 and allow for a technician to perform certain maintenance functions on the turbofan engine 10. For example, these inspection holes 132 may in certain configurations be referred to as borescope inspection holes 132. It should be appreciated, however, that in certain embodiments the present disclosure, inspection holes 132 may further include igniter holes within the combustion section 26 (not depicted), or any other suitable openings leading to the core air flowpath 37 defined by the turbofan engine 10.

Referring still to FIG. 2, a maintenance tool 200 is additionally provided. As will be discussed in greater detail below, the maintenance tool 200 may allow for a user or technician to perform certain maintenance functions, including, e.g., inspection of one or more components of the turbofan engine 10 and/or spraying a coating on one or more components of the turbofan engine 10.

Figure 3:
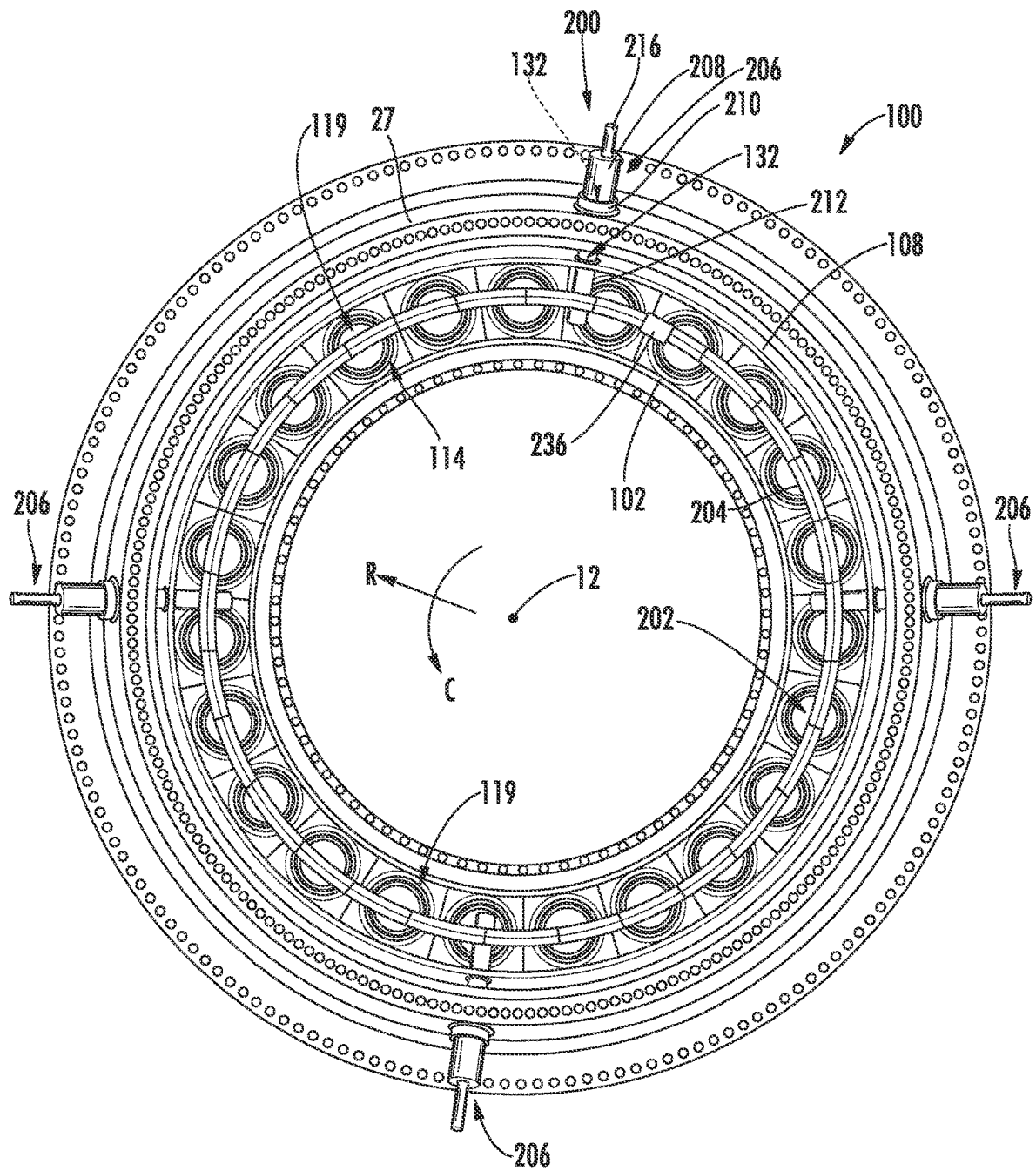
FIG. 3 is a view of the exemplary combustion section of FIG. 2, taken along an axial direction of the gas turbine engine, with a maintenance tool in accordance with an exemplary embodiment of the present disclosure position at least partially therein.

Referring now also to FIG. 3, the maintenance tool 200 will be described in more detail. FIG. 3 provides a view of the combustion section 26 of the turbofan engine 10 of FIGS. 1 and 2, along the axial direction A. As is depicted in FIGS. 1 and 2, the maintenance tool 200 generally includes a rail system 202 having a plurality of rail segments 204. The plurality of rail segments 204 are insertable through one or more of the inspection holes 132 of the turbofan engine 10 for assembly within the core air flowpath 37. (Note that the assembly process of the rail system 202 is described in greater detail below with reference to, e.g., FIG. 5.) More particularly, for the embodiment depicted in FIGS. 2 and 3, the plurality of rail segments 204 of the rail system 202 are assembled within the core air flowpath 37, and more particularly still, are assembled within the combustion chamber 114 of the combustor assembly 100 of the combustion section 26. Accordingly, it will be appreciated that for the embodiment depicted, the plurality of rail segments 204 are together configured for assembly within the combustion chamber 114 of the combustor assembly 100 of the combustion section 26. As will also be appreciated from the present disclosure, the rail system 202 of the exemplary maintenance tool 200 may be assembled within the core air flowpath 37 of the turbofan engine 10 while the turbofan engine 10 is substantially completely assembled. As used herein, "substantially completely assembled" refers to all the components forming the portion of the core air flowpath 37 within which the rail system 202 is assembled, or within which the rail system 202 will be assembled, remaining together and assembled (with the exception of any caps or plugs within the one or more inspection holes 132 being removed).

Notably, in other exemplary embodiments of the present disclosure, the rail system 202 of the exemplary maintenance tool 200 may instead be assembled within the core air flowpath 37 at any other suitable location of the turbofan engine 10. For example, in other exemplary embodiments, the rail system 202 of the exemplary maintenance tool 200 may instead be assembled within, e.g., the compressor section of the turbofan engine 10, or the turbine section of the turbofan engine 10. With such a configuration, the rail system 202 may be inserted through one or more of the inspection holes 132 in the compressor section of the turbofan engine 10 (such as within the HP compressor 24) and/or in the turbine section of the turbofan engine 10 (such as within the HP turbine 28).

Referring now particularly to the embodiment of FIG. 3, each of the plurality of rail segments 204 of the rail system 202 are connected to one another, and once assembled, the rail system 202 extends substantially along the circumferential direction C of the turbofan engine 10. More particularly, for the embodiment depicted, when the rail segments 204 of the rail system 202 are assembled within the core air flowpath 37, the rail system 202 (including the plurality of rail segments 204), extends substantially three hundred and sixty degrees(360°) within the core air flowpath 37, around the longitudinal centerline 12 of the turbofan engine 10. It should be appreciated, however, that in other exemplary embodiments, the rail system 202 may have any other suitable configuration. For example, in other exemplary embodiments, the rail system 202 may not extend substantially three hundred and sixty degrees(360°) within the core air flowpath 37 around the longitudinal centerline 12 of the turbofan engine 10, and instead may extend along the circumferential direction C within the core air flowpath 37 only partially around the longitudinal centerline 12 of the turbofan engine 10.

As is also depicted, the exemplary maintenance tool 200 further includes a radial clamp 206 attachable to the rail system 202 and extendable through one or more of the plurality of inspection holes 132 of the turbofan engine 10. More specifically, for the embodiment depicted, the maintenance tool 200 includes a plurality of radial clamps 206 attachable to the rail system 202 at locations along a length of the rail system 202 and spaced along the circumferential direction C of the turbofan engine 10. For example, as is depicted in FIG. 3, the exemplary maintenance tool 200 depicted includes four radial clamps 206 extending through respective inspection holes 132 and attached to the rail system 202 at locations along a length of the rail system 202. Each of the radial clamps 206 are spaced along the circumferential direction C of the turbofan engine 10. Notably, however, in other embodiments the maintenance tool 200 may include any other suitable number of radial clamps 206.

Figure 4:
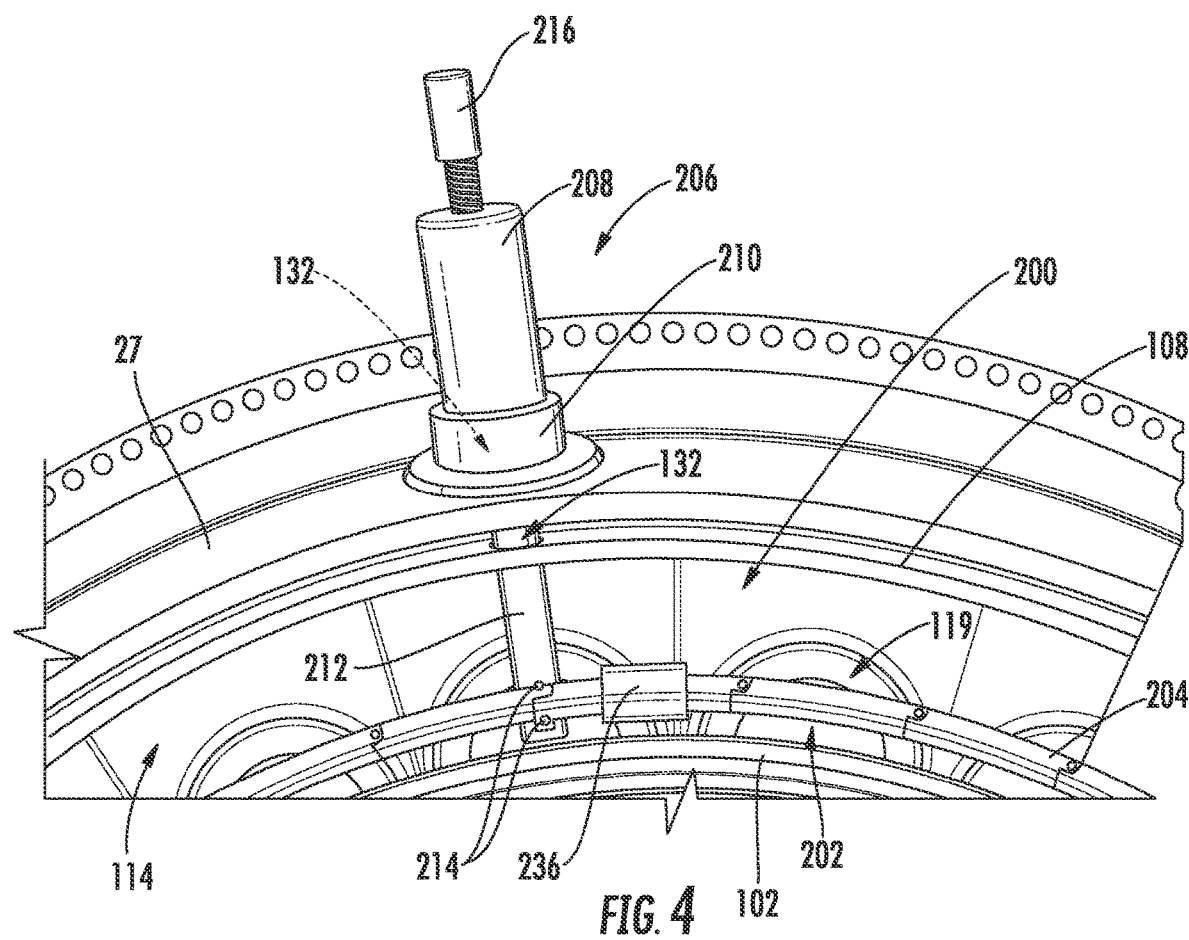
FIG. 4 is a close-up view of a portion of the exemplary maintenance tool depicted in FIG. 3.

Referring now also to FIG. 4, a close-up view of one of the radial clamps 206 and the rail system 202 of the maintenance tool 200 depicted in FIG. 3 is provided. As is depicted, the radial clamp 206 is further configured to attach to, for the embodiment depicted, the outer combustor casing 27 through which one of the inspection holes 132 is defined. For example, the radial clamp 206 depicted includes a body portion 208 attached to a borescope flange 210 of the outer combustor casing 27 surrounding/defining the inspection hole 132. The body portion 208 of the radial clamp 206 may attach to the borescope flange 210 of the outer combustor casing 27 using a threaded connection, or any other suitable attachment mechanism.

The radial clamp 206 depicted further includes a shaft 212 extending generally along the radial direction R into the core air flowpath 37 and attached to the rail system 202. More particularly, the shaft 212 of the radial clamp 26 extends through an inspection hole 132 defined in the outer liner 108 of the combustor assembly 100 (the inspection hole 132 of the outer liner 108 being aligned with the inspection hole 132 defined in the outer combustor casing 27). The shaft 212 includes a pair of attachment pins 214 at a distal end for attaching the radial clamp 206 to the rail system 202. The attachment pins 214 are, for the embodiment depicted, movable relative to one another along the radial direction R by a tightening handle 216 at a radially outer end of the radial clamp 206. Accordingly, the attachment pins 214 may be moved closer to one another by the tightening handle 216 in order to attach/clamp the radial clamp 206 to the rail system 202. Such a configuration may allow for the radial clamps 206 to stabilize the rail system 202 within the core air flowpath 37 relative to the outer combustor casing 27, and more particularly, to mount the rail system 202 at a desired location within the core air flowpath 37. Further, such a configuration may allow for the radial clamps 206 to consistently mount the rail system 202 within the core air flowpath 37 of the turbofan engine 10, i.e., at the same location within the core air flowpath 37 of the turbofan engine 10 over multiple maintenance inspections, despite the technician or operator assembling the rail system 202.

It should be appreciated, however, that in other exemplary embodiments, the maintenance tool 200 may include any other suitable structural configuration for mounting the rail system 202 within the core air flowpath 37 of the turbofan engine 10. For example, in other exemplary embodiments, the maintenance tool 200 may include one or more components for attaching the rail system 202 directly to, e.g., a turbine rotor blade, a turbine nozzle, etc.

Figure 5:
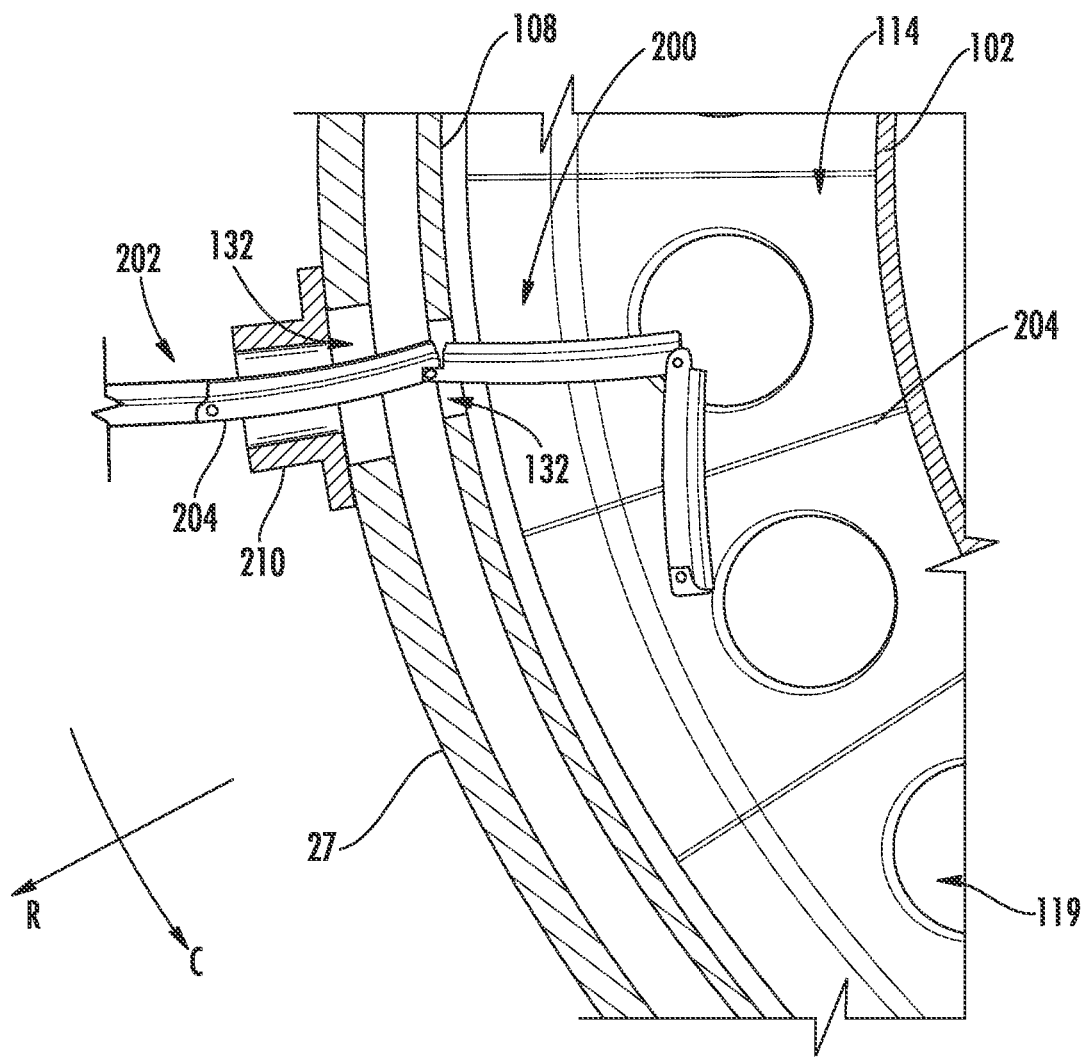
FIG. 5 is a view of the exemplary maintenance tool depicted in FIG. 3 being installed in the exemplary combustion section of FIG. 3.

Referring now to FIG. 5, a close-up view of the rail system 202 of the maintenance tool 200 described above with reference to FIGS. 2 through 4 is provided during assembly of the rail system 202. As stated above, the plurality of rail segments 204 of the rail system 202 are insertable through an individual one of the inspection holes 132 of the gas turbine engine for assembly within the core air flowpath 37. Additionally, each rail segment 204 of the plurality of rail segments 204 is connected to an adjacent rail segment 204, and more particularly, for the embodiment depicted, is pivotably connected at least at one end to an adjacent rail segment 204. Specifically, for the embodiment depicted, each of the interior rail segments 204 (i.e., a rail segment 204 other than the first or last rail segment 204) is pivotably connected at both ends to respective adjacent rail segments 204, and the first and last rail segments 204 are pivotably connected at just one end to an adjacent rail segment 204.

Figure 6:
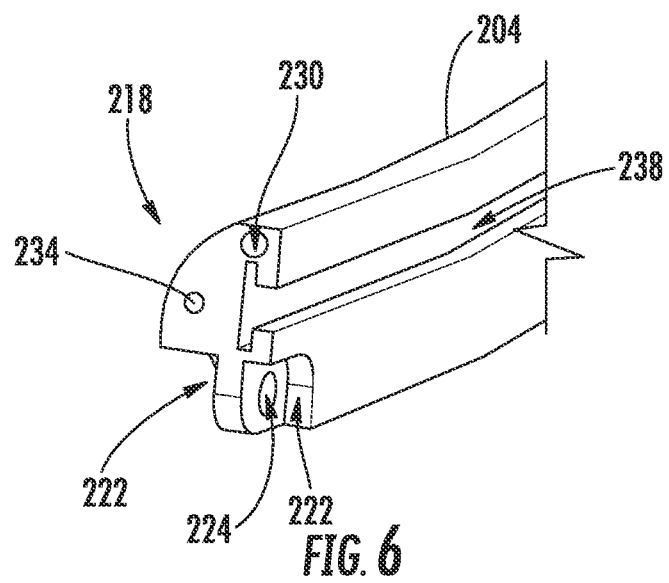
FIG. 6 is a first end view of a rail segment of the exemplary maintenance tool depicted in FIG. 3.
Figure 7:
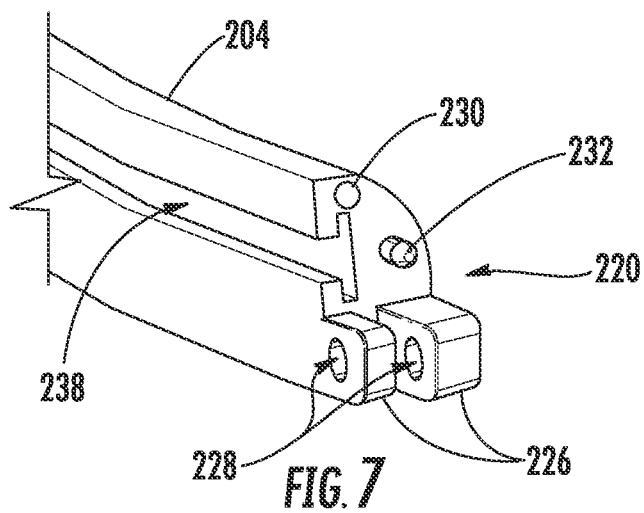
FIG. 7 is a second end view of a rail segment of the exemplary maintenance tool depicted in FIG. 3.

Referring now also to FIGS. 6 and 7, the pivotable connections for the exemplary rail system 202 of FIG. 5 will be described in greater detail. Each interior rail segment 204 extends lengthwise between a first end 218 and a second end 220 (i.e., along the circumferential direction C of the turbofan engine 10 when assembled). FIG. 6 depicts a first end 218 of an exemplary interior rail segment 204 and FIG. 7 depicts a second end 220 of the exemplary interior rail segment 204. As is depicted, for the embodiment of FIGS. 6 and 7, the first end 218 of the rail segment 204 is configured as a female end and the second end 220 of the rail segment 204 is configured as a male end. The male end of one rail segment 204 may be pinned to the female end of an adjacent rail segment 204. More specifically, the first, female end 218 of the rail segment 204 includes a pair of indentions 222 and an opening 224. Additionally, the second, male end 220 of the rail segment 204 includes a pair of extensions 226 configured to be received within the indentions 222 and an opening 228. When the extensions 226 at the second end 220 of the rail segment 204 are received within the indentions 222 at the first end 218 of an adjacent rail segment 204, the openings 224, 228 align such that a pin (not depicted) may extend therethrough to pivotably connect the two adjacent rail segments 204.

Notably, each of the first and second ends 218, 220 of the rail segments 204 depicted in FIGS. 6 and 7 additionally includes a magnetic portion 230. The magnetic portions 230 may assist with maintaining the rail segments 204 adjacent to one another during operation of the maintenance tool 200. More specifically, the magnetic portions 230 may each include a magnet recessed within the respective first and second ends 218, 220. Such a configuration allows for the rail segments 204 to releasably assemble, as is described in more detail below. Moreover, for the embodiment depicted the first end includes an alignment indention 232, and the second end 220 includes an alignment knob 234. When assembled, the alignment knob 234 is received within an alignment indention 232 of an adjacent rail segment 204 to ensure the adjacent rail segments 204 are properly aligned.

Referring again specifically to FIG. 5, it will be appreciated, that the rail system 202 having such a configuration may be assembled within the core air flowpath 37 by sequentially inserting the connected rail segments 204 individually through an individual one of the one or more inspection holes 132. The rail segments 204 may pivot relative to one another during this process to allow for a subsequent rail segment 204 to be inserted. Once positioned within the core air flowpath 37, however, the adjacent rail segments 204 may automatically assemble by virtue of the magnetic portions 230 of the adjacent ends 218, 220 of the rail segments 204. Notably, a first end 218 of the first rail segment 204 and a second end 220 of the last rail segment 204 (not depicted) may be attached and assembled within the core air flowpath 37 substantially completely using magnetic attachment mechanisms. Alternatively, one or more of the radial clamps 206 may be used to attach the first end 218 of the first rail segment 204 and a second end 220 of the last rail segment 204 within the core air flowpath 37 of the turbofan engine 10.

Notably, given this assembly method, in at least certain exemplary embodiments, one or more of the rail segments 204 of the rail system 202 may be formed of a material softer than the material forming the components defining the core air flowpath 37 within which the rail system 202 is assembled. For example, in certain exemplary embodiments, the rail segments 204 of the rail system 202 may be formed of a nonmetallic material, such as a plastic or plastic polymer material. Suitable plastic or plastic polymer materials for forming the rail segments 204 of the rail system 202 includes, without limitation poly(vinyl chloride) ("PVC"), polyethene ("PE"), polypropene ("PP"), etc. Additionally, or alternatively, one or more of the rail segments 204 may include a cushioning or guard formed of a material softer than the material forming the components defining the core air flowpath 37 within which the rail system 202 is assembled. For example, the first rail segment 204 may include a cushioning or guard on its forward end formed of, e.g., an elastomeric material to prevent scratching the components defining the core air flowpath 37 within which the rail system 202 is assembled.

Figure 8:
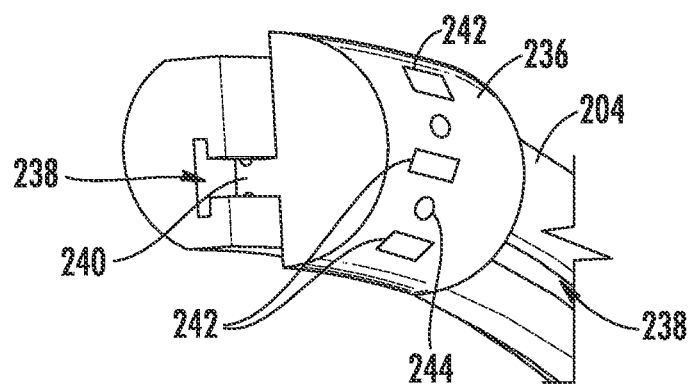
FIG. 8 is a perspective view of a maintenance head of a maintenance tool in accordance with an exemplary embodiment of the present disclosure.

Referring now back to FIG. 3 and also to FIG. 8, the maintenance tool 200 further includes a maintenance head 236 movable along the plurality of rail segments 204 of the rail system 202 for performing maintenance operations within the core air flowpath 37. FIG. 8 provides a perspective, cross-sectional view of a rail segment 204 of the rail system 202 of the exemplary maintenance tool 200 with a maintenance head 236 in accordance with an exemplary embodiment of the present disclosure.

As is depicted, each of the rail segments 204 for the exemplary rail system 202 of the maintenance tool 200 described herein defines a groove 238. The grooves 238 of each of the rail segments 204 are aligned when the rail segments 204 are assembled, such that the grooves 238 together form a continuous groove 238 extending along an entire length of the rail system 202 (i.e., three hundred and sixty degrees(360°) in the circumferential direction C around the longitudinal centerline 12 of the turbofan engine 10 for the embodiment depicted). The maintenance head 236 is slidably connected to the grooves 238 of each of the plurality of rail segments 204 and is therefore movable along the grooves 238 of each of the plurality of rail segments 204. For the embodiment depicted, the grooves 238 defined by the plurality of rail segments 204 are each configured as a "T-shaped" groove and the maintenance head 236 for the exemplary maintenance tool 200 depicted includes a "T-shape" flange 240 slidably positioned within the grooves 238. However, in other exemplary embodiments, the maintenance head 236 may be slidably or movably connected to the plurality of rail segments 204 of the rail system 202 in any other suitable manner.

Referring particularly to FIG. 8, it will be appreciated, that for the embodiment depicted, the maintenance tool 200 is configured as an inspection tool, and the maintenance head 236 comprises one or more cameras 242 and one or more light sources 244. Specifically, for the embodiment depicted, the maintenance head 236 includes three cameras 242 and two light sources 244. The cameras 242 may be used to take images (including still or moving images) allowing an operator or technician to inspect the various components of the turbofan engine 10 exposed to the core air flowpath 37. For example, the cameras 242 may be used to take images of, or inspect, the dome of the combustor assembly 100, the inner and/or outer liners 102, 108 of the combustor assembly 100, the first stage turbine nozzles 68 of the HP turbine 28, the first stage turbine rotor blades 70 of the HP turbine 28, etc.

Each of the one or more cameras 242 may be operably connected to a control system (not depicted) configured to receive the one or more images captured by the one or more cameras 242. The one or more cameras 242 may be in wired or wireless communication with the control system. Moreover, the maintenance head 236 may be configured to store the images captured by the one or more cameras 242, or alternatively, the one or more cameras 242 may be configured to communicate directly with the control system during operation, such that a user or technician may view the images captured in real-time.

Figure 9:
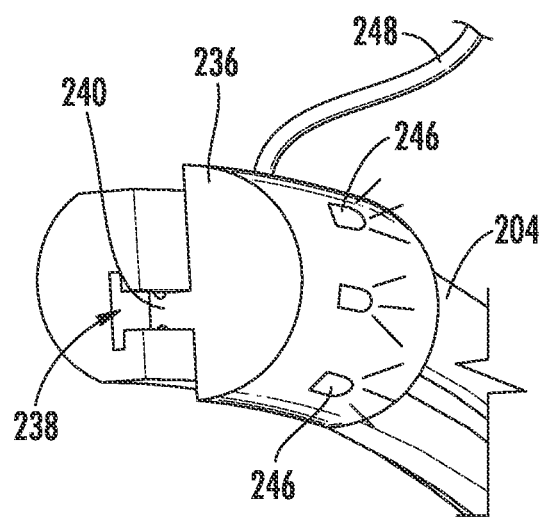
FIG. 9 is a perspective view of a maintenance head of a maintenance tool in accordance with another exemplary embodiment of the present disclosure.

It should be appreciated, however, that in other exemplary embodiments, the maintenance head 236 may have any other suitable configuration. For example, in other exemplary embodiments, the maintenance head 236 may have any other suitable number of light sources 244 or cameras 242. Additionally the cameras 242 and light sources 244 may be directed in any other suitable direction. Moreover, it will be appreciated, that in other exemplary embodiments of the present disclosure, the maintenance head 236 may be configured to perform any other suitable maintenance operations of the gas turbine engine. For example, referring now briefly to FIG. 9, providing a maintenance head 236 in accordance with another exemplary embodiment of the present disclosure, the maintenance head 236 may instead include one or more spray nozzles 246 for spraying a protective coating on one or more components of the turbofan engine 10. For example, the maintenance head 236 may spray a thermal barrier coating, or any other suitable coating on an inner or outer liner 102, 108 of the combustor assembly 100, on the dome of the combustor assembly 100, on the first stage turbine nozzles 68 of the HP turbine 28, on the first stage turbine rotor blades 70 of the HP turbine 28, etc. Notably, with this configuration, the maintenance tool 200 further includes a coating supply line 248 fluidly connected to the nozzle 246 (directly, or through the maintenance head 236) for providing the nozzle 246 with a flow of the desired coating. The fluid supply line 248 may extend through one or more of the inspection holes 132 of the turbofan engine 10 to an outside a coating source.

Figure 10:
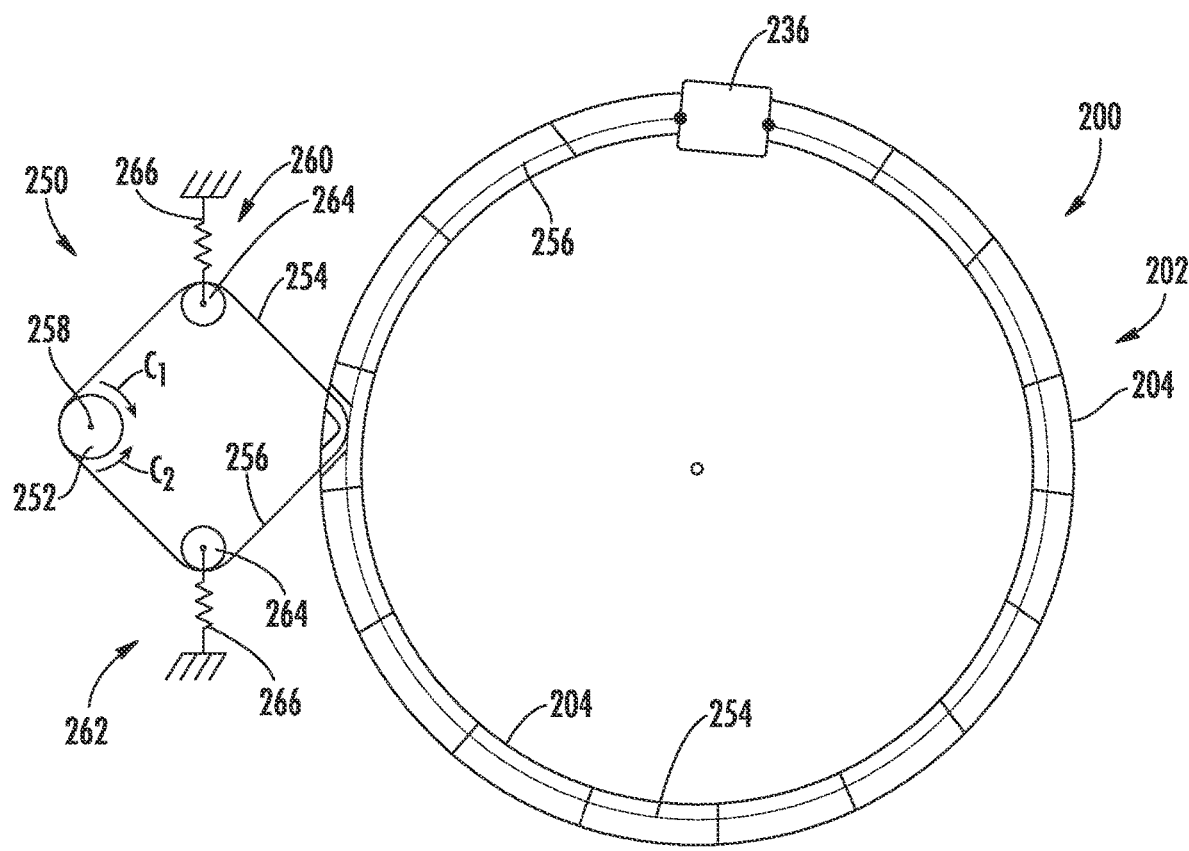
FIG. 10 is a schematic view of a maintenance tool including an actuation device in accordance with an exemplary embodiment of the present disclosure.
Figure 11:
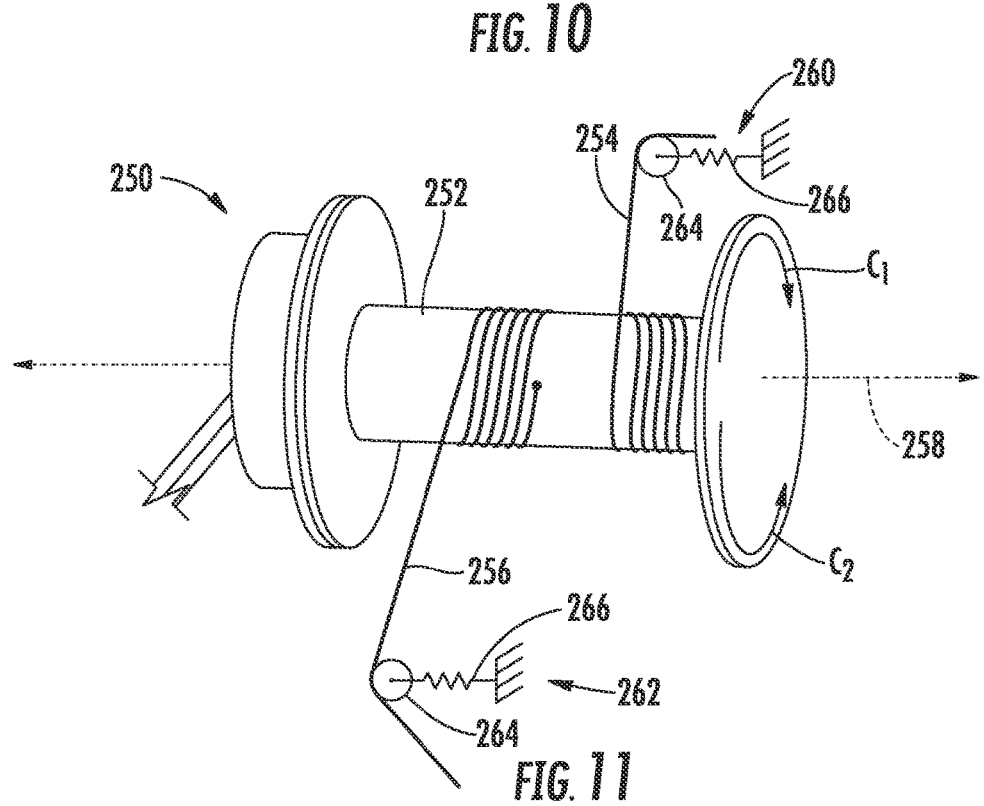
FIG. 11 is a perspective, schematic view of the exemplary actuation device of the exemplary maintenance tool depicted in FIG. 10.
Figure 12:
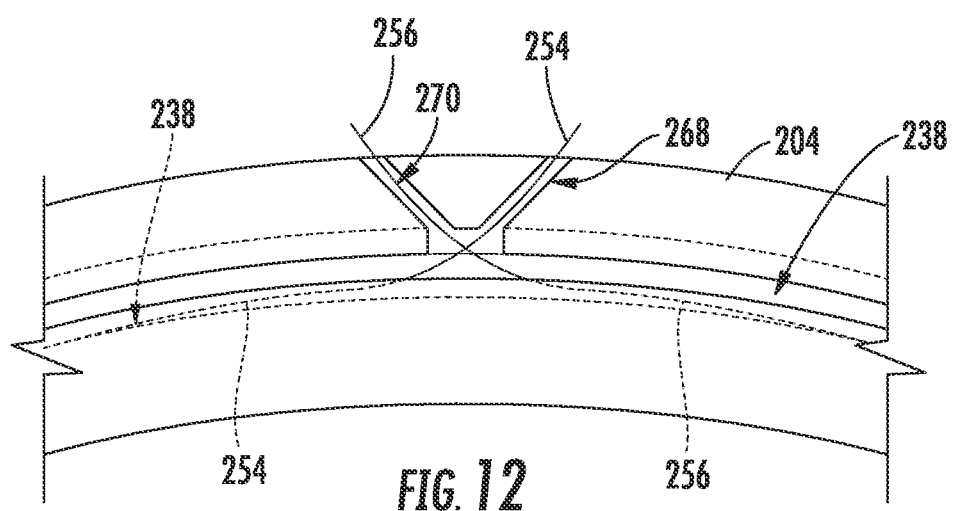
FIG. 12 is a close-up view of a rail segment of the exemplary maintenance tool of FIG. 10 in accordance with an exemplary embodiment of the present disclosure.

Referring now to FIGS. 10 through 12, a maintenance tool 200 in accordance with an exemplary embodiment of the present disclosure is provided. FIG. 10 provides a schematic view of the maintenance tool 200 having the plurality of rail segments 204 of the rail system 202 assembled; FIG. 11 provides a perspective, schematic view of an actuation device of the exemplary maintenance tool 200; and FIG. 12 provides a close-up view of a rail segment 204 of the exemplary maintenance tool 200. The exemplary maintenance tool 200 of FIGS. 10 through 12 may be configured in substantially the same manner as one or more the exemplary maintenance tools 200 described above with reference to FIGS. 2 through 9. For example, the exemplary maintenance tool 200 of FIGS. 10 through 12 includes a rail system 202 having a plurality of rail segments 204 and a maintenance head 236 movable along the plurality of rail segments 204 of the rail system 202.

Additionally, referring specifically to FIG. 10, the exemplary maintenance tool 200 further includes an actuation device operable with the maintenance head 236 to move the maintenance head 236 along the plurality of rail segments 204 of the rail system 202. For the embodiment depicted, the actuation device is configured as a pulley system 250, the pulley system 250 generally including a spool 252, a first line 254 and a second line 256. The spool 252 is rotatable about a central axis 258 by, e.g., a motor or operator. The first and second lines 254, 256 are each attached to the maintenance head 236 of the maintenance tool 200.

Referring particularly to FIG. 11, it will be appreciated that the first line 254 is wrapped around the spool 252 in a first circumferential direction C1 of the spool 252, while the second line 256 is wrapped around the spool 252 in a second circumferential direction C2 of the spool 252 (opposite the first circumferential direction C1). Such a configuration accordingly ensures that rotation of the spool 252 about its central axis 258 retracts one line at substantially the same speed that it extends the other line. For example, rotation of the spool 252 about its central axis 258 in the first circumferential direction C1 extends the first line 254 at a first speed and simultaneously retracts the second line 256 at a second speed. With the present configuration, the first speed is substantially equal to the second speed.

Moreover, in order to further ensure that the first and second lines 254, 256 remain tensioned and to account for any other abnormalities, the pulley system 250 further includes a first tensioner 260 operable with the first line 254 in a second tensioner 262 operable with the second line 256. Each of the first tensioner 260 and the second tensioner 262 generally include a wheel 264 operable with the first line 254 and second line 256, respectively, and an elastic member 266, which for the embodiment depicted is configured as a spring unit.

It should be appreciated, however, that in other exemplary embodiments, the pulley system 250 may be configured in any other suitable manner. For example, the pulley system 250 may instead include two spools, and further may include any other form of tensioner. For example, in other exemplary embodiments, one or both of the first tensioner 260 or second tensioner 262 may include two or more elastic members 266 and wheels 264.

Referring now particularly to FIG. 12, at least one of the rail segments 204 of the rail system 202 defines an opening for the first and second lines 254, 256 of the pulley system 250. More particularly, for the embodiment depicted, one of the rail segments 204 includes a first opening 268 for the first line 254 and a second opening 270 for the second line 256. The first and second openings 268, 270 each extend into the groove 238 defined by the respective rail segment 204. More specifically, for the embodiment depicted, the groove 238 is configured as a "T-shaped" groove (the radially inner and outer portions of which depicted in phantom; see also FIG. 8), and the first and second lines 254, 256 are configured to remain within a radially inner section of the "T-shaped" groove 238 (also depicted in phantom). Notably, however, that in other exemplary embodiments, the rail segment 204 may only include a single opening for each of the first and second lines 254, 256 to extend therethrough.

It should be appreciated that in certain embodiments, the first and second lines 254, 256 of the pulley system 250 may extend through one or more of the inspection holes 132 of the gas turbine engine when the maintenance tool 200 is assembled within the core air flowpath 37 of the gas turbine engine. For example, each of the first and second lines 254, 256 may extend through the same inspection hole 132, or alternatively, each may extend through a separate, individual inspection hole 132. With these configurations, the actuation device remains outside of the core air flowpath 37 when the maintenance tool 200 is assembled.

Further, it should be appreciated, that in other exemplary embodiments, the actuation device may instead be configured in any other suitable manner for moving the maintenance head 236 of the maintenance tool 200. Moreover, although the maintenance tool 200 is described herein as being used with a turbofan engine, it should be appreciated that the maintenance tool 200 may instead be used with any other suitable gas turbine engine, such as a turboshaft engine, a turboprop engine, a turbojet engine, etc.

Inclusion of an actuation device in accordance with one or more exemplary embodiments of the present disclosure may ensure a precise location of the maintenance head 236 is known during operation of the maintenance tool 200. For example, the actuation device may include an encoder to determine a location of the maintenance head 236. More specifically, when the actuation device is a spool assembly, a rotary encoder may be included on or otherwise operable with the spool to determine a precise location of the maintenance head 236 based at least in part on an amount of rotation of the spool. Accordingly, inclusion of an actuation device in accordance with one or more exemplary embodiments of the present disclosure may allow for a user or technician to accurately catalog the images taken of the various components of the gas turbine engine during maintenance operations. Such may ensure that any potentially problematic areas identified during such maintenance operations may be watched more closely during subsequent maintenance operations. Notably, this benefit is provided despite maintenance operations being performed by, e.g., an inexperienced technician, or by various different technicians during different maintenance operations.

Figure 13:
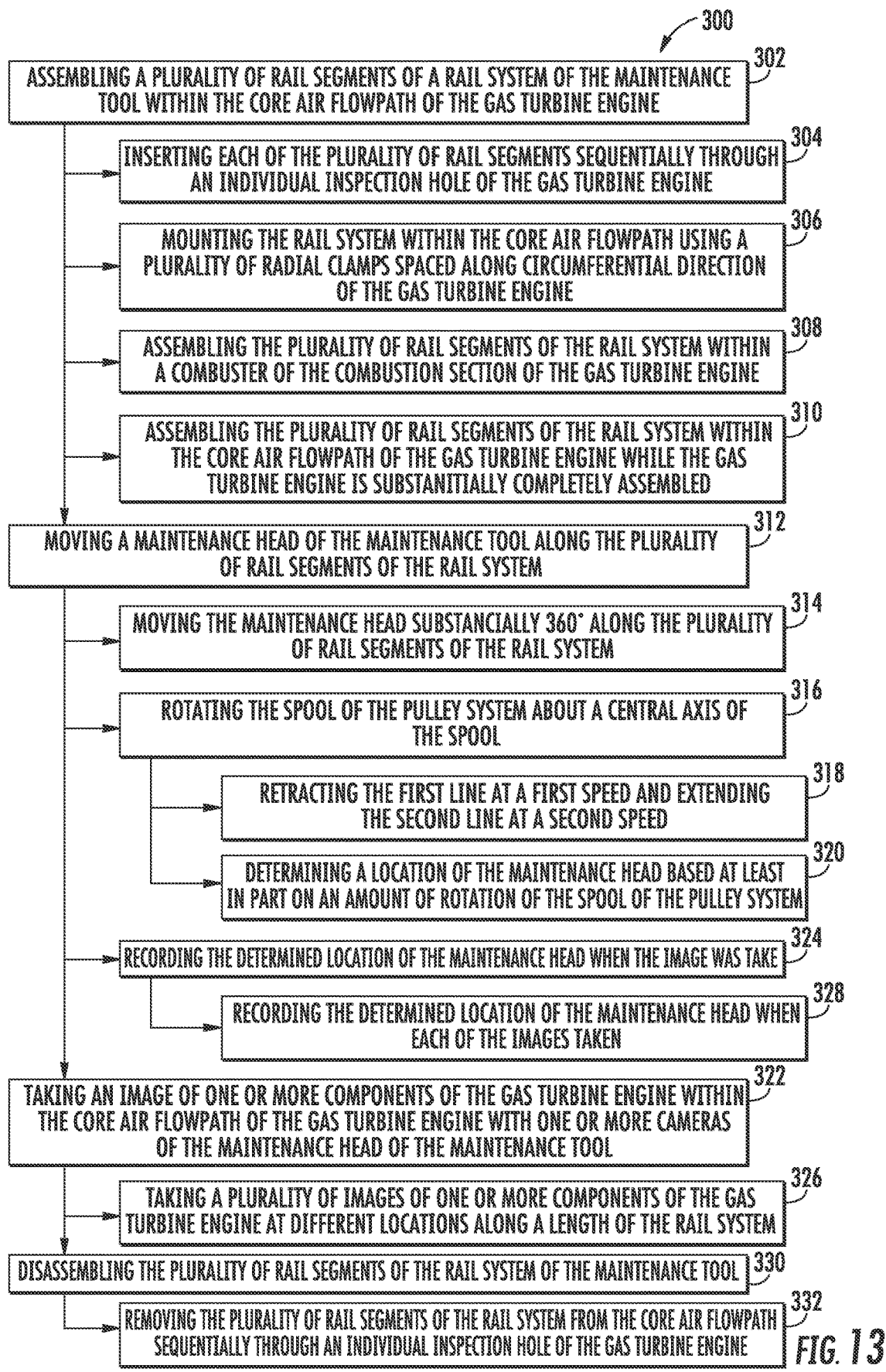
FIG. 13 is a flow diagram of a method for performing maintenance operations in accordance with an exemplary aspect of the present disclosure.

Referring now to FIG. 13, a flow diagram of a method 300 for maintaining a gas turbine engine using a maintenance tool is provided. In certain exemplary aspects, the method 300 may be utilized with one or more of the gas turbine engines and/or with one or more of the maintenance tools described above with reference to FIGS. 1 through 12. Accordingly, in certain exemplary aspects, the gas turbine engine may include a compressor section, combustion section, and a turbine section in serial flow order and together defining at least in part a core air flowpath. Additionally, the gas turbine engine may define one or more inspection holes.

The method 300 generally includes at (302) assembling a plurality of rail segments of a rail system of the maintenance tool within the core air flowpath of the gas turbine engine. More specifically, for the exemplary aspect depicted, assembling the plurality of rail segments at (302) includes at (304) inserting each of the plurality of rail segments sequentially through an individual inspection hole of the gas turbine engine. Notably, depending on the particular configuration of the gas turbine engine, inserting each of the plurality of rail segments at (304) sequentially through an individual inspection hole may include inserting each of the plurality of rail segments sequentially through a first, outer inspection hole (e.g., defined by an outer casing, such as an outer combustor casing) and through a second, inner inspection hole (e.g., defined by an inner component, such as an outer combustor liner). With such an exemplary aspect, the first and second inspection holes may be substantially aligned (see, e.g., FIG. 2).

Once the plurality of rail segments are positioned within the core air flowpath, the plurality of rail segments may snap together automatically by virtue of magnetic portions at adjacent ends of the adjacent rail segments. Additionally, for the method 300 the exemplary aspect depicted in FIG. 13, assembling the plurality of rail segments at (302) includes at (306) mounting the rail system within the core air flowpath using one or more radial clamps, or more specifically, mounting the rail system within the core air flowpath using a plurality of radial clamps spaced along a circumferential direction of the gas turbine engine. As will be appreciated, the plurality of radial clamps may extend through/attached to one or more inspection holes and may include a mechanism at a distal end for attaching to the rail system of the maintenance tool.

Assembling the plurality of rail segments at (302) may include assembling the plurality of rail segments at any suitable location within the core air flowpath, including, e.g., within the compressor section, the combustion section, or the turbine section. However, for the exemplary aspect depicted in FIG. 13, assembling the plurality of rail segments at (302) includes at (308) assembling the plurality of rail segments of the rail system within a combustor of the combustion section of the gas turbine engine. Accordingly, the exemplary maintenance tool may be utilized, for the exemplary method 300 depicted, for performing certain maintenance operations within the combustor assembly of the gas turbine engine.

Notably, the exemplary method 300 may be utilized to perform maintenance operations without requiring any substantial disassembly of the gas turbine engine. For example, the only modification to the gas turbine engine required for implementing the method 300 is for one or more caps or plugs positioned within one or more of the inspection holes to be removed to allow for the assembly of the plurality of rail segments at (302). Accordingly, assembly of the plurality of rail segments at (302) includes, for the exemplary aspect depicted, at (310) assembling the plurality of rail segments of the rail system within the core air flowpath of the gas turbine engine while the gas turbine engine is substantially completely assembled.

Referring still to FIG. 13, for the exemplary aspect depicted, the method 300 additionally includes at (312) moving a maintenance head of the maintenance tool along the plurality of rail segments of the rail system to perform maintenance operations within the core air flowpath of the gas turbine engine. As will be appreciated, in certain exemplary aspects, the rail system may extend substantially three hundred and sixty degrees(360°) within the core air flowpath about a longitudinal axis of the gas turbine engine. Accordingly, for the exemplary aspect depicted, moving the maintenance head of the maintenance tool at (312) includes at (314) moving the maintenance head substantially three hundred and sixty degrees (360°) along the plurality of rail segments of the rail system.

Moreover, for the exemplary aspect depicted, moving the maintenance head at (312) additionally includes moving the maintenance head using an actuation device of the maintenance tool. More specifically, for the exemplary aspect depicted, the actuation device of the maintenance tool is configured as a pulley system having a spool, a first line, and a second line. Accordingly, for the exemplary aspect depicted, moving the maintenance head at (312) includes at (316) rotating the spool of the pulley system about a central axis of the spool. More specifically still, rotating the spool of the pulley system at (316) includes, for the exemplary aspect depicted, at (318) retracting the first line at a first speed and extending the second line at a second speed. It will be appreciated that for the exemplary aspect depicted both the first line and the second line are attached to the maintenance head, with the first line extending along the rail system to the maintenance head in a circumferential direction opposite a circumferential direction in which the second line extends along the rail system to the maintenance head (the "circumferential directions" here referring to a circumferential direction of the gas turbine engine when the maintenance tool is installed in the gas turbine engine). Additionally, the first speed is substantially equal to the second speed, such that the maintenance head may move in a smooth and controlled manner along the rail system.

Additionally, with such an actuator device configuration, a precise location of the maintenance head may be determined. For example, for the exemplary aspect depicted, rotating the spool of the pulley system about the central axis at (316) further includes at (320) determining a location of the maintenance head based at least in part on an amount of rotation of the spool of the pulley system. For example, the method 300 may include determining the location of the maintenance head at (316) based on a starting position of the maintenance head and a length of the first line retracted and/or a length of the second line extended. Additionally, or alternatively, the method 300 may include determining the location of the maintenance head at (316) using an encoder on or operable with the actuator device.

Furthermore, it should be appreciated, that for the exemplary aspect depicted in FIG. 13, the method 300 for maintaining the gas turbine engine is more specifically a method for inspecting the gas turbine engine. Accordingly, the method further includes at (322) taking an image of one or more components of the gas turbine engine within the core air flowpath of the gas turbine engine with one or more cameras of the maintenance head of the maintenance tool. Notably, taking the image at (322) may occur simultaneously with, or subsequent to, moving the maintenance head at (312).

Additionally, for the exemplary aspect depicted, moving the maintenance head at (312) includes determining a location of the maintenance head (e.g., based at least in part on an amount of rotation of the spool of the pulley system at (320)), and taking the image of one or more components of the gas turbine engine at (322) includes at (324) recording the determined location of the maintenance head when the image was taken.

More specifically, for the exemplary aspect depicted, taking the image of one or more components of the gas turbine engine at (322) includes at (326) taking a plurality of images of one or more components of the gas turbine engine at different locations along a length of the rail system. And, more specifically still, for the exemplary aspect depicted, recording the determined location of the maintenance head at (324) includes at (328) recording the determined location of the maintenance head when each of the images taken.

Notably, by recording a location of the maintenance head when the images are taken allows for the method 300 to catalog the images based on e.g., the location of the maintenance head, the component being imaged, etc. Further, the mounting of the rail system of the maintenance tool in accordance with the present method 300 provides for a relatively consistent mounting and location of the maintenance tool within the core air flowpath, despite the technician or operator installing the maintenance tool. Accordingly, over multiple maintenance inspection cycles, images of specific components, or regions of the gas turbine engine from within the core air flowpath, may be consistently taken. This allows for an operator or technician to compare images of the same component over time, or images of the same region over time, such that the operator or technician may keep an eye on any potentially problematic areas and prevent any potential damage areas from going unnoticed.

Moreover, such an exemplary method 300 enables components within a particular gas turbine engine to be compared with the same components in a different gas turbine engine (by virtue of the precision of the maintenance tool and maintenance method). These may be components within gas turbine engines being operating by different customers and in different environmental conditions. For example, the parts or components running more engine cycles can be quickly compared with newer parts or components. The exemplary method 300 enables effective preventative action quickly and meaningfully when needed. Technicians may access field experience data quickly and obtain accurate information as to what to expect with continuous engine operation. Further, engine maintenance schedules can be arranged with greater flexibility, and unnecessary engine overhaul can be avoided.

Referring still to FIG. 13, the method 300 further includes at (330) disassembling the plurality of rail segments of the rail system of the maintenance tool. For the exemplary aspect depicted, disassembling the plurality of rail segments at (330) includes at (332) removing the plurality of rail segments of the rail system from the core air flowpath sequentially through an individual inspection hole of the gas turbine engine.

It should be appreciated, however, that in other exemplary aspects, the present disclosure may provide for any other suitable method for maintaining a gas turbine engine using a maintenance tool. For example, referring now to FIG. 14, a flow diagram of a method 400 for maintaining a gas turbine engine using a maintenance tool in accordance with another exemplary aspect of the present disclosure is provided. In certain exemplary aspects, the method 400 may also be utilized with one or more of the gas turbine engines and/or with one or more of the maintenance tools described above with reference to FIGS. 1 through 12. Accordingly, in certain exemplary aspects, the gas turbine engine may include a compressor section, combustion section, and a turbine section in serial flow order and together defining at least in part a core air flowpath. Additionally, the gas turbine engine may define one or more inspection holes.

Furthermore, the exemplary method 400 depicted in the flowchart of FIG. 14 may be substantially similar to the exemplary method 300 depicted in the flowchart of FIG. 13. For example, the exemplary method 400 includes at (402) assembling a plurality of rail segments of a rail system of the maintenance tool within the core air flowpath of the gas turbine engine. Additionally, the exemplary method 400 includes at (404) moving a maintenance head of the maintenance tool along the plurality of rail segments of the rail system to perform maintenance operations within the core air flowpath of the gas turbine engine.

However, the maintenance operations performed in the exemplary method 400 depicted in FIG. 14 do not necessarily include inspecting the components exposed to the core air flowpath. Instead, or in addition, the maintenance operations of the exemplary method 400 include spraying a coating on such components. Accordingly, the exemplary method 400 depicted in FIG. 14 further includes at (406) spraying one or more components of the gas turbine engine with a coating using the maintenance head. The coating being sprayed at (406) may be a thermal barrier coating, or any other suitable coating for the component.

Additionally, for the exemplary aspect depicted, spraying one or more components of the gas turbine engine with the coating at (406) includes at (408) spraying one or more components of the gas turbine engine with the coating through one or more spray nozzles of the maintenance head. Moreover, for the exemplary aspect depicted, spraying one or more components of the gas turbine engine with the coating at (406) includes at (410) spraying one or more of an inner liner of a combustor of the combustion section of the gas turbine engine or an outer liner of the combustor of the combustion section of the gas turbine engine. However, in other exemplary aspects, the method 400 may include spraying any other suitable components.

Utilization of one or more the exemplary aspects of the exemplary method 400 depicted in FIG. 14 may allow for touching up or repairing components within, or exposed to, the core air flowpath of the gas turbine engine without requiring the gas turbine engine to be disassembled. For example, the method 400 depicted in FIG. 14 may allow a user or technician to reapply a thermal barrier coating on a component of the gas turbine engine after determining the existing thermal barrier coating is thin or has worn away. Notably, in other exemplary aspects, any other suitable protective coating may be sprayed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A maintenance tool for a gas turbine engine defining a core air flowpath and a plurality of inspection holes, the maintenance tool comprising:
   a rail system comprising a plurality of rail segments insertable through one or more of the inspection holes of the gas turbine engine for assembly within the core air flowpath, wherein the rail system is configured to be in a fixed position relative to the core air flowpath; and
   a maintenance head moveable along the plurality of rail segments of the rail system for performing maintenance operations within the core air flowpath, wherein the gas turbine engine comprises a combustion chamber, and wherein the plurality of rail segments are configured for assembly within the combustion chamber of the gas turbine engine,
   wherein the plurality of rail segments extends continuously around a longitudinal centerline of the gas turbine engine extending from a first end of the rail system to a second end of the rail system forming an annular rail system around the longitudinal centerline,
   wherein the maintenance tool is capable of performing a maintenance operation along the annular rail system when the rail system is in the fixed position, and
   wherein the annular rail system extends three hundred and sixty degrees(360°) within the core air flowpath when assembled within the core air flowpath.

2. The maintenance tool of claim 1, wherein each rail segment is pivotably connected to an adjacent rail segment prior to insertion through one or more of the inspection holes.

3. The maintenance tool of claim 2, wherein the assembly comprises adjusting alignment of adjacent rail segments.

4. The maintenance tool of claim 1, wherein the plurality of rail segments extend generally along a circumferential direction of the gas turbine engine when assembled within the core air flowpath of the gas turbine engine.

5. The maintenance tool of claim 1, further comprising:
   an actuation device operable with the maintenance head to move the maintenance head along the plurality of rail segments of the rail system.

6. The maintenance tool of claim 1, wherein the maintenance head comprises one or more cameras.

7. The maintenance tool of claim 6, wherein the maintenance head further comprises one or more light sources.

8. The maintenance tool of claim 1, wherein the maintenance head comprises one or more spray nozzles for spraying a coating on one or more components of the gas turbine engine.

9. The maintenance tool of claim 1, wherein each of the plurality of rail segments defines a groove, and wherein the maintenance head is movable along the groove of the plurality of rail segments, creating an annular groove associated with the annular rail system.

10. A gas turbine engine system comprising:
    a gas turbine engine having a compressor section, a combustion section, and a turbine section in serial flow order and together defining at least in part a core air flowpath, the gas turbine engine defining one or more inspection holes; and
    a maintenance tool comprising:
      a rail system comprising a plurality of rail segments assembled within the core air flowpath; and
      a maintenance head positioned within the core air flowpath and moveable along the plurality of rail segments of the rail system for performing maintenance operations within the core air flowpath, wherein the gas turbine engine comprises a combustion chamber, and wherein the plurality of rail segments are configured for assembly within the combustion chamber of the gas turbine engine, wherein the rail system is configured to be in a fixed position relative to the core air flowpath,
    wherein the plurality of rail segments extend continuously around a longitudinal centerline of the gas turbine engine extending from a first end of the rail system to a second end of the rail system, wherein the first end is connected to the second end, creating an annular rail system when assembled, and
    wherein the maintenance tool is capable of performing a maintenance operation along the annular rail system when the rail system is in the fixed position.

11. The gas turbine engine system of claim 10, wherein each rail segment is connected to an adjacent rail segment.

12. The gas turbine engine system of claim 10, wherein the annular rail system extends three hundred and sixty degrees(360°) within the core air flowpath.

13. The gas turbine engine of claim 10, wherein the maintenance tool further comprises an actuation device operable with the maintenance head to move the maintenance head along the plurality of rail segments of the rail system, and wherein the actuation device is located outside the core air flowpath.

14. A method for maintaining a gas turbine engine using a maintenance tool, the gas turbine engine having a compressor section, a combustion section, and a turbine section in serial flow order and together defining at least in part a core air flowpath, the gas turbine engine defining one or more inspection holes, the method comprising:
    assembling a plurality of rail segments of a rail system of the maintenance tool within the core air flowpath of the gas turbine engine, wherein the rail system is configured to be in a fixed position relative to the core air flowpath; and
    moving a maintenance head of the maintenance tool along the plurality of rail segments of the rail system to perform maintenance operations within the core air flowpath of the gas turbine engine, wherein assembling the plurality of rail segments of the rail system comprises assembling the plurality of rail segments of the rail system within a combustor of the combustion section of the gas turbine engine, wherein the plurality of rail segments extend continuously around a longitudinal centerline of the gas turbine engine extending from a first end of the rail system to a second end of the rail system, wherein the first end is connected to the second end, creating a continuous rail system when assembled, and wherein the maintenance tool is capable of performing a maintenance operation along the continuous rail system when the rail system is in the fixed position.

15. The method of claim 14, wherein each rail segment is connected to an adjacent rail segment.

16. The method of claim 14, wherein moving the maintenance head of the maintenance tool along the plurality of rail segments of the rail system comprises moving the maintenance head three hundred and sixty degrees(360°) along the plurality of rail segments of the rail system.

17. The method of claim 14, wherein moving the maintenance head of the maintenance tool along the plurality of rail segments of the rail system comprises moving the maintenance head of the maintenance tool using an actuation device of the maintenance tool.

18. The method of claim 14, wherein assembling the plurality of rail segments of the rail system comprises inserting each of the plurality of rail segments sequentially through an individual inspection hole of the gas turbine engine.

19. The method of claim 14, further comprising:

taking an image of one or more components of the gas turbine engine within the core air flowpath of the gas turbine engine with one or more cameras of the maintenance head of the maintenance tool.

\* \* \* \* \*